(12) United States Patent
Lu et al.

(10) Patent No.: US 11,670,070 B2
(45) Date of Patent: Jun. 6, 2023

(54) CLOUD-EDGE-END COOPERATIVE CONTROL METHOD OF 5G NETWORKED UNMANNED AERIAL VEHICLE FOR SECURITY RESCUE

(71) Applicant: Guangdong University of Technology, Guangzhou (CN)

(72) Inventors: Renquan Lu, Guangzhou (CN); Hongxia Rao, Guangzhou (CN); Yong Xu, Guangzhou (CN); Yuru Guo, Guangzhou (CN); Jie Tao, Guangzhou (CN); Chang Liu, Guangzhou (CN); Ye Kuang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/563,356

(22) Filed: Dec. 28, 2021

(65) Prior Publication Data
US 2022/0207855 A1    Jun. 30, 2022

(30) Foreign Application Priority Data
Dec. 28, 2020   (CN) .......................... 202011587981.6

(51) Int. Cl.
*G06V 10/75*      (2022.01)
*G06V 20/17*      (2022.01)
(Continued)

(52) U.S. Cl.
CPC ............ *G06V 10/443* (2022.01); *G06V 10/25* (2022.01); *G06V 10/255* (2022.01);
(Continued)

(58) Field of Classification Search
CPC .... G06V 10/443; G06V 10/25; G06V 10/255; G06V 10/766; G06V 10/82; G06V 10/88; G06V 20/56
See application file for complete search history.

(56) References Cited

U.S. PATENT DOCUMENTS

| | | | |
|---|---|---|---|
| 10,909,392 B1 * | 2/2021 | Chaudhuri | ........... G05D 1/0214 |
| 2021/0117697 A1 * | 4/2021 | Guim Bernat | ....... G08G 1/0133 |

(Continued)

OTHER PUBLICATIONS

CN 202011587981.6—Notification of Granting Patent Right to the Invention, dated May 14, 2021, 3 pages. (with English translation).

*Primary Examiner* — John W Lee
(74) *Attorney, Agent, or Firm* — Getech Law LLC; Jun Ye

(57) ABSTRACT

The present invention discloses a cloud-edge-end cooperative control method of a 5G networked UAV for security rescue, including: an image acquisition step: performing, by a single-chip microcomputer, attitude resolution on data acquired by a detection sensor, to obtain image data; a sparse landmark map building step: performing, by a control platform, front-end feature point matching, local map building and optimization, loopback detection, and frame resolution on the image data, to generate a sparse landmark map; a three-dimensional dense map building step: generating, by an edge cloud, a three-dimensional dense map based on a key frame pose and key frame observation data of the sparse landmark map; a high-precision semantic map building step: obtaining a high-precision semantic map; and a UAV movement step: adjusting, by the driving mechanism, a pose of the UAV according to the three-dimensional dense map or the high-precision semantic map.

8 Claims, 1 Drawing Sheet

(51) Int. Cl.
*G06T 15/00* (2011.01)
*G06F 16/29* (2019.01)
*G06T 7/33* (2017.01)
*G06T 17/05* (2011.01)
*G06V 10/26* (2022.01)
*G08C 17/02* (2006.01)
*H04L 67/10* (2022.01)
*H04N 21/2187* (2011.01)
*G06V 10/44* (2022.01)
*G06V 10/25* (2022.01)
*G06V 10/82* (2022.01)
*G06V 10/88* (2022.01)
*G06V 10/20* (2022.01)
*G06V 10/766* (2022.01)
*G06V 20/56* (2022.01)

(52) U.S. Cl.
CPC ............ *G06V 10/766* (2022.01); *G06V 10/82* (2022.01); *G06V 10/88* (2022.01); *G06V 20/56* (2022.01)

(56) References Cited

U.S. PATENT DOCUMENTS

2022/0050477 A1\* 2/2022 Kennedy ............. G08G 5/0069
2022/0067838 A1\* 3/2022 Fields ................ G01C 21/3461

\* cited by examiner

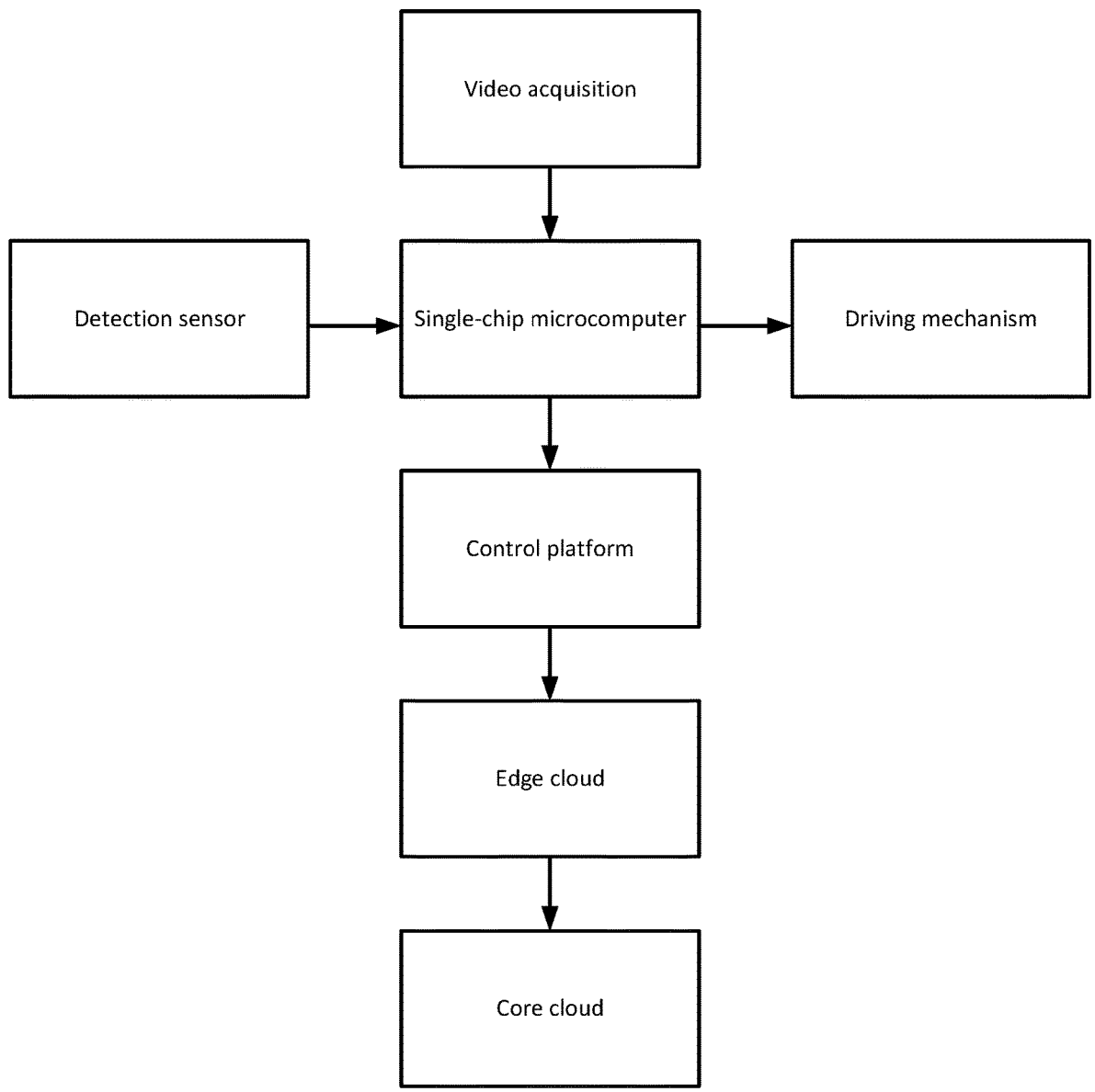

CLOUD-EDGE-END COOPERATIVE CONTROL METHOD OF 5G NETWORKED UNMANNED AERIAL VEHICLE FOR SECURITY RESCUE

TECHNICAL FIELD

The present invention relates to the technical field of unmanned aerial vehicles (UAV), and in particular, to a cloud-edge-end cooperative control method of a 5G networked UAV for security rescue.

BACKGROUND

At present, UAVs used in the field of security rescue are mainly controlled manually via remote controllers, and most of data transmission and image transmission systems of the UAVs use 2.4 G/5.8 G wireless frequency bands or a fourth-generation mobile information technology (4G) for communication. There is a problem of limited control distance, which restricts a flight range of a UAV to a great extent, and reduces a success rate of remote detection or rescue missions performed by the UAV.

For security rescue missions, the video return definition of the UAV is a very important auxiliary element, so that a lot of business needs such as intelligent video analysis, path planning, map building and the like require very fast and accurate computing power. In addition, the current mainstream GPS positioning precision is controlled at the meter level. In practical application such as complex terrain detection, ignition point detection, and precise delivery of goods and materials, the meter-level precision cannot meet the needs of users to the greatest extent. Moreover, slam (positioning and map building) is an important technology for UAV-based positioning, navigation, and map building. However, in all solutions in the market, the entire step of slam algorithm computation is completed by equipping a UAV with a high-performance embedded chip, which causes high price and high power consumption. If video analysis or data computation is carried out on a UAV side, computing power on the UAV side is greatly consumed, a UAV needs to be equipped with an expensive high-performance computing platform, and power consumption of the UAV is increased. If all computations are carried out on a cloud side, when communicating with an application server deployed on a public network, the UAV needs to take such a line of UAV-wireless communication-base station-core network-Internet-application server. As the base station, the core network, and the Internet are still traditional optical fiber infrastructures, there is a relatively large latency from the base station to the Internet in the communication line, ranging from tens of milliseconds to hundreds of milliseconds. For a UAV in flight, the latency may affect the real-time performance and precision in control and navigation, and make the data transmission cost high.

SUMMARY

To overcome the foregoing defects, an objective of the present invention is to provide a cloud-edge-end cooperative control method of a 5G networked UAV for security rescue, which can reduce not only the energy consumption of the UAV but also the latency of data transmission.

To achieve this objective, the present invention adopts the following technical solutions: A cloud-edge-end cooperative control method of a 5G networked UAV for security rescue is provided, including an image acquisition step, a sparse landmark map building step, a three-dimensional dense map building step, a UAV movement step, and a high-precision semantic map building step, where the UAV includes a single-chip microcomputer, a detection sensor, a control platform, and a driving mechanism, where the control platform is in bidirectional communication connection with an edge cloud through 5G communication, and the edge cloud is in bidirectional communication connection with a core cloud through 5G communication;

the sparse landmark map building step is: synchronously performing, by the control platform, front-end feature point matching, local map building and optimization, loopback detection, and frame resolution on the image data, to generate a sparse landmark map;

the three-dimensional dense map building step is: acquiring, by the edge cloud, depth information of each pixel point based on a key frame pose and key frame observation data of the sparse landmark map, and then performing depth information recovery to generate a three-dimensional dense map;

the high-precision semantic map building step is: performing, by the core cloud, semantic segmentation based on a deep learning MASK-RCNN framework according to the three-dimensional dense map, to obtain a high-precision semantic map; and the UAV movement step is: adjusting, by the driving mechanism, a pose of the UAV according to the three-dimensional dense map or the high-precision semantic map.

For example, the method further includes a 4K live streaming media step, where the UVA further includes a video acquisition component;

the 4K live streaming media step is: firstly, acquiring, by the video acquisition component, a real-time picture, performing encoding and encapsulating to generate a primary video, and pushing the primary video to the edge cloud;

then, preprocessing, by the edge cloud, the real-time video to generate a preprocessed video, and transmitting the preprocessed video to the core cloud; and finally, extracting, by the core cloud, an emergency and key video via big data analysis and a deep learning algorithm, and transmitting the emergency and key video to a disaster remote command terminal; and further transcoding, by the core cloud, the preprocessed video, and performing distribution and transmission to a live video output terminal.

It should be noted that, in the sparse landmark map building step, the front-end feature point matching is:

firstly, extracting ORB feature points from the image data;

then, computing BOW feature vectors of all the ORB feature points of a current frame of the image data, and setting a feature point threshold value to match all the ORB feature points of corresponding nodes between the current frame and a previous frame to obtain a front-end matching pair; and finally, optimizing the front-end matching pair via RANSAC to remove the ORB feature points which do not meet the optimization requirements; and computing a pose of the current frame by using the front-end matching pair to perform a PNP algorithm, and re-positioning the UVA based on the pose of the current frame when the UAV is lost in tracking.

Optionally, in the sparse landmark map building step, the local map building and optimization includes local optimization and local map building;

the local optimization is: when the ORB feature points are enough, tracking a local map, and updating a local key frame and the ORB feature points;

then, finding a local matching pair from the local map for the current frame, optimizing the current frame via pose graph optimization, and updating statistical data of map points; and finally, screening for a key frame, and inserting the key frame to provide the key frame for the local map building.

Specially, in the sparse landmark map building step, the local map building is:

firstly, inserting a local key frame into a map;

secondly, removing a key frame from the map, which does meet the observation requirements;

thirdly, performing local bundle adjustment-based map optimization; and finally, checking key frames of a local co-visibility graph of a current key frame, and removing redundant local key frames.

Preferably, in the local map building, a key frame, which does not meet the observation requirements, in a current map point is a key frame when the proportion of the current map points observed by all key frames is less than 0.25, or a key frame when the current map points are not observed for more than two consecutive frames, or a key frame when the current map points are not continuously observed for three consecutive frames after being observed.

For example, in the sparse landmark map building step, the loopback detection is:

firstly, computing an MIN_S as a reference value by using the key frame of the co-visibility graph and the current key frame, detecting candidate frames meeting the MIN_S from a database, and then performing geometric verification on all the candidate frames, where the MIN_S is the lowest matching score of the BOW;

secondly, computing feature matching relationships between the current key frame and the candidate frames, setting the current key frame meeting a threshold condition of the local matching pair as a candidate frame, and setting a corresponding solution frame; and finally, performing iterative solution relative motion on the solution frame, performing re-projection matching according to an iterative solution relative motion relationship, and setting the candidate frame as a loopback frame when a matching quantity meets a threshold condition of the re-projection matching.

It should be noted that, in the sparse landmark map building step, the frame resolution is:

firstly, terminating the bundle adjustment-based map optimization, and updating the key frame of the co-visibility graph corresponding to the current frame;

secondly, updating an attitude of the key frame of the co-visibility graph by using an attitude of the current frame estimated based on the loopback frame;

thirdly, according to the attitude information of the updated key frame, correcting the current frame and the map point corresponding to the key frame of the co-visibility graph corresponding to the current frame, and updating the key frame of the co-visibility graph corresponding to current frame; and finally, optimizing an essential graph, starting the bundle adjustment-based map optimization again, updating the poses of all the key frames, and continuously updating all the map points by using the poses of the optimized key frames to generate a sparse landmark map.

Optionally, in the three-dimensional dense map building step, the depth information recovery is specially:

A: when a pose of a new key frame is generated, determining a position of a projection point via epipolar line search and block matching;

B: computing a depth and uncertainty of a triangulated position of the projection point according to a geometric relationship; and C: fusing a result of B with a previous depth information recovery result to obtain recovered depth information, and stopping computation when the recovered depth information is converged, or returning to B when the recovered depth information is not converged.

Specially, in the high-precision semantic map building step, the semantic segmentation is specially:

firstly, inputting the three-dimensional dense map into a pre-trained neural network to obtain a feature map;

secondly, presetting an ROI for each point in the feature map and sending the ROI to an RPN network for binary classification and BB regression, and filtering out some of candidate ROIs to obtain a target ROI;

thirdly, matching the three-dimensional dense map with pixels of the feature map, and then matching the feature map with fixed features; and finally, performing N-category classification, BB regression, and MASK generation on the target ROI.

The present invention has the beneficial effects that, according to the cloud-edge-end cooperative control method of a 5G networked UAV for security rescue, a positioning and trajectory attitude part with relatively high real-time performance requirements and relatively simple computation is put into a UAV body, so that the computing power burden on a UAV side is reduced. A part needing GPU acceleration-based dense depth estimation is put into the edge cloud for computation, and a semantic map with object labels is put into the core cloud for building. The data interaction of the processes is realized in combination with the characteristics of large bandwidth and low latency of 5G network slices.

According to the cloud-edge-end cooperative control method of a 5G networked UAV for security rescue, a sparse landmark point map with a relatively small computed quantity is built based on a slam algorithm and put into the UAV for operation, and then the obtained trajectory and landmark points of the sparse landmark map are transmitted to a nearest edge cloud (5G micro base station) through a 5G network. The edge cloud is combined with the trajectory and the landmark points of the sparse landmark map, the depth of each pixel is restored via an epipolar line search and block matching technology, and thus the three-dimensional dense map is obtained.

In addition, the three-dimensional map is re-built based on a visual slam algorithm, and video analysis and data computation are performed the edge cloud. Acquired image information can be utilized to the most extent on the premise of relatively small dependence on sensors and relatively low cost, so that positioning and map building are realized in the process of movement. In addition, the UAV is helped to perform accurate autonomous navigation and path planning, which greatly reduces the cost of manpower.

The cloud-edge-end cooperative control method is used when the UAV is remotely controlled. If a security rescue site needs ultra-low latency control to complete some operations with relatively high control latency requirements, a user-edge cloud-UAV control method can be used, which can reduce the latency to about several ms. If over-the-horizon sensor data return and flight plan issuance need to be implemented, the UAV can be controlled remotely without distance limitation under the condition of 5G coverage via such loop communication of UAV-edge cloud-core cloud.

In navigation, positioning and mapping, the UAV transmits image information to the edge cloud, a part for building the three-dimensional dense map based on the slam algorithm is deployed in the edge cloud, and a processed result is transmitted back to the control platform of the UAV through 5G, thereby deploying a part with slam algorithm-based complex computation in the edge cloud to reduce the computing power and power consumption of the UAV. By combining the characteristic of low latency of 5G with edge computation, sensor information required for the slam algorithm is transmitted to the edge cloud for processing. A high-performance embedded processor can be deployed in the edge cloud, so that the cost can be reduced, and the same edge cloud can meet the computation needs of a plurality of UAVs.

BRIEF DESCRIPTION OF THE DRAWING

FIG. 1 is a schematic structural diagram according to an embodiment of the present invention.

DETAILED DESCRIPTION

The following describes embodiments of the present invention in detail. Examples of the embodiments of the present invention are illustrated in the accompanying drawings. Reference numerals which are the same or similar throughout the accompanying drawings represent the same or similar elements or elements with the same or similar functions. The embodiments described below with reference to the accompanying drawings are examples and used merely to interpret the present invention, rather than being construed as limitations to the present invention.

The following disclosure provides many different embodiments or examples of different structures for implementing embodiments of the present invention. In order to simplify the disclosure of embodiments of the present invention, components and arrangements of specific examples are described below. Of course, they are merely examples and are not intended to limit the present invention. In addition, embodiments of the present invention may repeat reference numerals and/or reference letters in different examples. Such repetition is for the purpose of simplicity and clarity, and does not by itself indicate a relationship between the various embodiments and/or arrangements discussed.

As shown in FIG. 1, a cloud-edge-end cooperative control method of a 5G networked UAV for security rescue includes an image acquisition step, a sparse landmark map building step, a three-dimensional dense map building step, a UAV movement step, and a high-precision semantic map building step;

the UAV includes a single-chip microcomputer, a detection sensor, a control platform, and a driving mechanism, where the control platform is in bidirectional communication connection with an edge cloud through 5G communication, and the edge cloud is in bidirectional communication connection with a core cloud through 5G communication;

the image acquisition step is: performing, by the single-chip microcomputer, attitude resolution on data acquired by the detection sensor, to obtain image data;

the sparse landmark map building step is: synchronously performing, by the control platform, front-end feature point matching, local map building and optimization, loopback detection, and frame resolution on the image data, to generate a sparse landmark map;

the three-dimensional dense map building step is: acquiring, by the edge cloud, depth information of each pixel point based on a key frame pose and key frame observation data of the sparse landmark map, and then performing depth information recovery to generate a three-dimensional dense map;

the high-precision semantic map building step is: performing, by the core cloud, semantic segmentation based on a deep learning MASK-RCNN framework according to the three-dimensional dense map, to obtain a high-precision semantic map; and the UAV movement step is: adjusting, by the driving mechanism, a pose of the UAV according to the three-dimensional dense map or the high-precision semantic map.

According to the cloud-edge-end cooperative control method of a 5G networked UAV for security rescue, a positioning and trajectory attitude part with relatively high real-time performance requirements and relatively simple computation is put into a UAV body, so that the computing power burden on a UAV side is reduced. A part needing GPU acceleration-based dense depth estimation is put into the edge cloud for computation. A semantic map with object labels is put into the core cloud for building. The data interaction of the processes is realized by combining the characteristics of large bandwidth and low latency of 5G network slices.

According to the cloud-edge-end cooperative control method of a 5G networked UAV for security rescue, a sparse landmark point map with a relatively small computed quantity is built based on a slam algorithm and put into the UAV for operation, and then the obtained trajectory and landmark points of the sparse landmark map are transmitted to a nearest edge cloud (5G micro base station) through a 5G network. The edge cloud is combined with the trajectory and the landmark points of the sparse landmark map, the depth of each pixel is restored via an epipolar line search and block matching technology, and thus the three-dimensional dense map is obtained.

In addition, the three-dimensional map is re-built based on a visual slam algorithm, and video analysis and data computation are performed the edge cloud. Acquired image information can be utilized to the most extent on the premise of relatively small dependence on sensors and relatively low cost, so that positioning and map building are realized in the process of movement. In addition, the UAV is helped to perform accurate autonomous navigation and path planning, which greatly reduces the cost of manpower.

The cloud-edge-end cooperative control method is used when the UAV is remotely controlled. If a security rescue site needs ultra-low latency control to complete some operations with relatively high control latency requirements, a user-edge cloud-UAV control method can be used, which can reduce the latency to about several ms. If over-the-horizon sensor data return and flight plan issuance need to be implemented, the UAV can be controlled remotely without distance limitation under the condition of 5G coverage via such loop communication as UAV-edge cloud-core cloud.

In navigation, positioning and mapping, the UAV transmits image information to the edge cloud, a part for building the three-dimensional dense map based on the slam algorithm is deployed in the edge cloud, and a processed result is transmitted back to the control platform of the UAV through 5G, thereby deploying a part with slam algorithm-based complex computation in the edge cloud to reduce the computing power and power consumption of the UAV. By combining the characteristic of low latency of 5G with edge computation, sensor information required for the slam algorithm is transmitted to the edge cloud for processing. A high-performance embedded processor can be deployed in the edge cloud, so that the cost can be reduced, and the same edge cloud can also meet the computation needs of a plurality of UAVs.

The single-chip microcomputer as a core of a flight management system adopts PID, ADRC, LQR, MPC or sliding mode control to control the stability of an airplane, and the single-chip microcomputer is preferably STM32. The detection sensor includes a barometer, a GPS, a compass, an inertial measurement unit, and an altimeter. The control platform as a core of audio and video encoding includes Hisilicon hi3519A and an SIM8200 5G module. A 5G communication function can be realized by carrying the SIM8200 5G module.

The cloud-edge-end cooperative control method applies a design though of cloud-edge-end cooperation, and widens the boundary of cloud computation via edge computation to realize the control of over-the-horizon. Compared with a traditional remote controller control method, the control method is to transmit data of the flight management system to a Hisilicon hi3519A embedded board through a UAV communication protocol. The data in the hi3519A are uploaded to an Internet of Things platform in the edge cloud based on an MQTT protocol. A user can select two different data interaction modes of client-edge cloud-UAV or client-core cloud-edge cloud-UAV as required.

In addition, a python application is created on the hi3519A through DroneKit, the data interaction between the flight management system and the hi3519A is realized based on DroneKit-python, the programming access to the state and parameter information of the UAV is completed, and the running and operation of the UAV are directly controlled. The communication between the hi3519A and an edge cloud platform is realized based on the paho. Mqtt and the MQTT protocol, and a client is established on a hi3519A end based on Paho. Data interaction with an MQTT cloud server is completed through the 5G module.

The method specifically includes the following steps: firstly, calling a client. connect ( ) function, and connecting the client. connect ( ) function to an Internet of Things platform server in the edge cloud; secondly, reading and writing data in a receiving cache area or data in a sending cache area on a separate thread by using a client. loop_start ( ) function, and calling a corresponding callback function; thirdly, calling a mavutil. mavlink_connection ( ) function to establish a mavlink protocol connection with the hi3519A through a serial port; fourthly, calling a masterA recv_match ( ) function, setting the reception of a message of a specified type (attitude, position, imu, accelerometer, etc.), and checking whether the message is valid or not before attempting to parse the message; and repeating the process, uploading the data of the flight management system to the Internet of Things platform in the edge cloud in real time, and receiving a downlink control instruction and a flight plan of the edge cloud in real time.

MAVLink is a lightweight and mature communication protocol for an aircraft, and can directly generate an MSG code through a ready-made configuration tool. MQTT (Message Queuing Telemetry Transport) is a lightweight communication protocol based on a publishing/subscribing model, which is built on a TCP/IP protocol. MQTT as a communication protocol can provide a real-time and reliable message service for a UAV with few codes and limited bandwidth and can effectively improve the precision and the real-time performance of control by being coupled with the low-latency characteristic of 5G. MQTT as an instant messaging protocol with low overhead and low bandwidth occupation runs on top of TCP and belongs to an application layer protocol. Therefore, MQTT can be used wherever a TCP/IP protocol stack is supported. A 5G edge computation cloud node can realize data interaction with a UAV only via simple configuration. Similarly, the communication between an edge cloud and a core cloud can also be realized through an MQTT protocol, that is, in an environment covered with a 5G signal, a user can control a UAV without distance limitation, thus effectively improving the efficiency of rescue. More experienced control personnel can control aircrafts to complete rescue tasks such as material delivery in an ultra-remote manner.

Among a cloud, an edge, and an end, the end is a UAV, and mainly acquires video data; the edge is an edge cloud, can be deployed in a 5G micro base station nearest to the UAV, and consists of a high-performance embedded device (arm architecture) or a workstation (x86 architecture), the 5G micro base station is lightweight and can be deployed quickly, and can be deployed on site during disaster rescue, the edge cloud is used for facilitating on-site control of UAVs in disaster areas, and since the latency is very low, two devices do not need to communicate through the core cloud within the coverage of the same base station; and the cloud is a core cloud and refers to a core network, the edge cloud can control UAVs in any place of the country through the core network, preferably Alicloud, and the core cloud is used for data storage and further data processing.

In the sparse landmark map building step, a key frame can be screened out from the image data, and then pose information and feature point data are obtained from the key frame through the geometric constraint of feature points, where the pose information is a pose of the key frame of the sparse landmark map, and the feature point data is observation data of the key frame of the sparse landmark map. The key frame screening strategy specifically includes the following steps: the key frame is inserted at an interval of at least 20 frames from the last time; when a local map building thread is idle, or 20 frames have passed from the previous key frame insertion, if the key frame needs to be inserted (20 frames have passed) but the local map building thread is busy, a signal is sent to the local map building thread to stop the local map optimization, so that a new key frame can be processed in time; a current frame tracks at least 50 points, to ensure the precision of tracking and positioning; and the current frame tracks less than 90% of the map points to a reference frame in the local map building to ensure a significant visual change between the key frames.

According to some embodiments, a cloud-edge-end cooperative control method of a 5G networked unmanned aerial vehicle (UAV) for security rescue further includes a 4K live streaming media step, where the UVA further includes a video acquisition component;

the 4K live streaming media step is: firstly, acquiring, by the video acquisition component, a real-time picture, performing encoding and encapsulating to generate a primary video, and pushing the primary video to the edge cloud;

then, preprocessing, by the edge cloud, the real-time video to generate a preprocessed video, and transmitting the preprocessed video to the core cloud; and finally, extracting, by the core cloud, an emergency and key video via big data analysis and a deep learning algorithm, and transmitting the emergency and key video to a disaster remote command terminal; and further transcoding, by the core cloud, the preprocessed video, and performing distribution and transmission to a live video output terminal.

The steps are combined with large bandwidth of 5G and a 4K streaming media technology, and combined with a hi3519A chip hardware encoding module and a streaming media server to realize a long-distance 4K video live video. In the 4K live streaming media step, by mainly using the characteristic of large bandwidth of 5G in combination with encoding and decoding, encapsulating, a streaming media protocol and other technologies, preprocessing is performed through the edge cloud to reduce the pressure of the core cloud.

The edge cloud preprocesses the video quickly, deletes some redundant video data, and transmits relatively valuable video data to the core cloud. Personnel of a disaster remote command center check emergency and key videos through a disaster remote command terminal. People concerned about an earthquake disaster can view a real-time 4K live video of a disaster area through live video output terminals on mobile phones or PCs.

The selection of the edge cloud may be diversified, and the edge cloud may be a relatively fixed edge cloud in an undamaged 5G base station nearest to the disaster area, or may be a mobile edge cloud composed of small and mobile high-performance embedded devices with 5G communication functions carried by rescue vehicles or personnel. Because an area where an earthquake occurs is often difficult to predict, the mobile edge cloud can provide required services and cloud computation functions for disaster rescue nearby, thus creating a network service environment with high performance, low latency and large bandwidth. In a 4K live video system, video information acquired by a UAV can be pushed to an optimal node through an edge computation server, to ensure that rescue workers have access to the best uplink network, reduce the latency caused via uplink transmission, and reduce the computation pressure of the core cloud at the same time.

After a lens optical signal acquired by a video acquisition component is projected to a photosensitive area of a sensor, the sensor registers a callback function to a 3A algorithm and an ISP, the 3A algorithm registers a callback function to the ISP, an ISP control unit dispatches an ISP basic algorithm library and a 3A algorithm library to perform real-time computation and corresponding control, and an image of an RGB spatial domain is output to an acquisition unit of the video acquisition component.

Encoding is to perform compressed encoding on an original video and original audio data to reduce the volume of the video. Encoding is one of core links, and is also a link that tests the performance of equipment most. The steps are accelerated by a hardware decoder on the hi3519A. In the steps, a compressed encoding mode of H264 is applied, and intra-frame prediction compression, inter-frame prediction compression, integer discrete cosine transform (DCT), CABAC compression and other methods are mainly used to compress the video and eliminate the redundant data in the spatial and temporal domains. The compressed frames are mainly divided into an I frame, a P frame and a B frame. The intra-frame compression algorithm is to generate the I frame, and the inter-frame compression algorithm is to generate the B frame and the P frame. In an H.264 benchmark class, only the I and P frames are used to realize low latency.

Encoding is to perform compressed encoding on an original video and original audio data to reduce the volume of the video. Encoding is one of core links, and is also a link that tests the performance of equipment most. The steps are accelerated by a hardware decoder on the hi3519A. In the steps, a compressed encoding mode of H264 is applied, and intra-frame prediction compression, inter-frame prediction compression, integer discrete cosine transform (DCT), CABAC compression and other methods are mainly used to compress the video and eliminate the redundant data in the spatial and temporal domains. The compressed frames are mainly divided into an I frame, a P frame and a B frame. The intra-frame compression algorithm is to generate the I frame, and the inter-frame compression algorithm is to generate the B frame and the P frame. In an H.264 benchmark class, only the I and P frames are used to realize low latency.

For example, in the sparse landmark map building step, the front-end feature point matching is:

firstly, extracting ORB feature points from the image data;

then, computing BOW feature vectors of all the ORB feature points of a current frame of the image data, and setting a feature point threshold value to match all the ORB feature points of corresponding nodes between the current frame and a previous frame to obtain a front-end matching pair; and finally, optimizing the front-end matching pair via RANSAC to remove the ORB feature points which do not meet the optimization requirements; and computing a pose of the current frame by using the front-end matching pair to perform a PNP algorithm, and re-positioning the UVA based on the pose of the current frame when the UAV is lost in tracking.

The feature point threshold value is that the Hamming distance of two descriptors is less than twice the minimum distance. RANSAC is an algorithm to compute mathematical model parameters of data by using a group of sample data sets containing abnormal data to obtain effective sample data. The RANSAC algorithm is used in computer vision. A PnP solution algorithm is to perform solution on external parameters of a camera by using a minimized re-projection error through a plurality of pairs of 3D and 2D matching points under the condition that internal parameters of the camera are known or unknown.

It should be noted that in the sparse landmark map building step, the local map building and optimization includes local optimization and local map building;

the local optimization is: when the ORB feature points are enough, tracking a local map, and updating a local key frame and the ORB feature points;

then, finding a local matching pair from the local map for the current frame, optimizing the current frame via pose graph optimization, and updating statistical data of map points; and finally, screening for a key frame, and inserting the key frame to provide the key frame for the local map building.

When the number of the ORB feature points is more than 50, it means that the ORB feature points are enough.

The map points are maps composed of the ORB feature points. The local map is obtained via local map building, the key frame is selected from the current frame, the local key frame includes key frames which share a co-visibility graph, and the key frames of the co-visibility graph refer to key frames for seeing the same landmark point.

Optionally, in the sparse landmark map building step, the local map building is:

firstly, inserting a local key frame into a map;

secondly, removing a key frame from the map, which does meet the observation requirements;

thirdly, performing local bundle adjustment-based map optimization; and finally, checking key frames of a local co-visibility graph of a current key frame, and removing redundant local key frames.

According to bundle adjustment, an attitude of the camera and three-dimensional coordinates of measurement points are taken as unknown parameters, and coordinates of feature points detected in an image for forward intersection are taken as observation data, so as to obtain optimal camera parameters and world point coordinates.

The local co-visibility graph is a graph that reflects a relationship between frames. When the local co-visibility graph is established, only the frames and keys are related. The local co-visibility graph records a key frame that has the most common map points with each key frame.

When a local key frame of a local map point has a repetition rate of more than 90% in at least three other frames, the local key frame is considered redundant and is then eliminated.

Specifically, in the local map building, a key frame, which does not meet the observation requirements, in a current map point is a key frame when the proportion of the current map points observed by all key frames is less than 0.25, or a key frame when the current map points are not observed for more than two consecutive frames, or a key frame when the current map points are not continuously observed for three consecutive frames after being observed.

When one of the three situations is reached, a corresponding local key frame can be removed.

Preferably, in the sparse landmark map building step, the loopback detection is:

firstly, computing an MIN_S as a reference value by using the key frame of the co-visibility graph and the current key frame, detecting candidate frames meeting the MIN_S from a database, and then performing geometric verification on all the candidate frames, where the MIN_S is the lowest matching score of the BOW;

secondly, computing feature matching relationships between the current key frame and the candidate frames, setting the current key frame meeting a threshold condition of the local matching pair as a candidate frame, and setting a corresponding solution frame; and finally, performing iterative solution relative motion on the solution frame, performing re-projection matching according to an iterative solution relative motion relationship, and setting the candidate frame as a loopback frame when a matching quantity meets a threshold condition of the re-projection matching.

A threshold condition of a local matching pair is that the number of matching points of the current key frames and the candidate frames is more than 40. The purpose of the re-projection matching in the steps is to find a better matching pair, and a threshold of the re-projection matching is one pixel.

In some embodiments, in the sparse landmark map building step, the frame resolution is:

firstly, terminating the bundle adjustment-based map optimization, and updating the key frame of the co-visibility graph corresponding to the current frame;

secondly, updating an attitude of the key frame of the co-visibility graph by using an attitude of the current frame estimated based on the loopback frame;

thirdly, according to the attitude information of the updated key frame, correcting the current frame and the map point corresponding to the key frame of the co-visibility graph corresponding to the current frame, and updating the key frame of the co-visibility graph corresponding to current frame; and finally, optimizing an essential graph, starting the bundle adjustment-based map optimization again, updating the poses of all the key frames, and continuously updating all the map points by using the poses of the optimized key frames to generate a sparse landmark map.

In the steps, map points corresponding to a current frame and a key frame of the co-visibility graph of the current key are corrected according to the attitude information of the updated key frame, and the current frame and the key frame of the co-visibility graph are updated, so that it can be ensured that the current frame establishes a relationship with the loop frame.

For example, in the sparse landmark map building step, the depth information recovery is specially:

A: when a pose of a new key frame is generated, determining a position of a projection point via epipolar line search and block matching;

B: computing a depth and uncertainty of a triangulated position of the projection point according to a geometric relationship; and C: fusing a result of B with a previous depth information recovery result to obtain recovered depth information, and stopping computation when the recovered depth information is converged, or returning to B when the recovered depth information is not converged.

When the minimum variance of the recovered depth information is less than 0.1, it represents convergence.

It should be noted that in the high-precision semantic map building step, the semantic segmentation is specifically:

firstly, inputting the three-dimensional dense map into a pre-trained neural network to obtain a feature map;

secondly, presetting an ROI for each point in the feature map and sending the ROI to an RPN network for binary classification and BB regression, and filtering out some of candidate ROIs to obtain a target ROI;

thirdly, matching the three-dimensional dense map with pixels of the feature map, and then matching the feature map with fixed features; and finally, performing N-category classification, BB regression, and MASK generation on the target ROI.

The N-category classification is a multi-classification method in deep learning; the BB regression is a method of regression analysis between an independent variable and a dependent variable; and the MASK is a mask and is a result of semantic segmentation. In a scene requiring semantic segmentation, an edge cloud uploads an obtained three-dimensional dense map to a core cloud, and the core cloud combines the semantic analysis and the slam result. The UAV can not only obtain geometric structure information in an environment, but also recognize independent individuals in the environment, and obtain semantic information such as their position, attitude and functional attributes, so as to cope with complex scenes and complete more intelligent tasks.

In the description of the specification, Reference to the terms "one embodiment", "some embodiments", "illustrative embodiments", "an example", "a specific example", or "some examples" means that a particular feature, structure, material, or characteristic described in connection with the embodiment or example is included in at least one embodiment or example of the present invention. In the present invention, exemplary expressions of the terms are not necessarily referring to the same embodiment or example. Moreover, the particular features, structures, materials, or characteristics described may be combined in any suitable manner in any one or more embodiments or examples Although embodiments of the present invention have been shown and described above, it is to be understood that the embodiments are exemplary and not restrictive of the present invention, and the variations, modifications, substitutions, and alterations on the embodiments can be made thereto by those skilled in the art without departing from the scope of the disclosure.

What is claimed is:

1. A cloud-edge-end cooperative control method of a 5G networked unmanned aerial vehicle (UAV) for security rescue, wherein the 5G networked UAV comprises a single-chip microcomputer, a detection sensor, a control platform, and a driving mechanism, wherein the control platform is in bidirectional communication connection with an edge cloud through 5G communication, and the edge cloud is in bidirectional communication connection with a core cloud through 5G communication, comprising: performing, by the single-chip microcomputer, attitude resolution on data acquired by the detection sensor, to obtain image data;

synchronously performing, by the control platform, front-end feature point matching, local map building and optimization, loopback detection, and frame resolution on the image data, to generate a sparse landmark map;

acquiring, by the edge cloud, depth information of each pixel point based on a key frame pose and key frame observation data of the sparse landmark map, and then performing depth information recovery to generate a three-dimensional dense map;

performing, by the core cloud, semantic segmentation based on a deep learning mask-regions with convolutional neural network (MASK-RCNN) framework according to the three-dimensional dense map, to obtain a high-precision semantic map;

adjusting, by the driving mechanism, a pose of the UAV according to the three-dimensional dense map or the high-precision semantic map;

acquiring, by a video acquisition component of the 5G networked UAV, a real-time picture, performing encoding and encapsulating to generate a primary video, and pushing the primary video to the edge cloud; preprocessing, by the edge cloud, the real-time video to generate a preprocessed video, and transmitting the preprocessed video to the core cloud; and extracting, by the core cloud, an emergency and key video via big data analysis and a deep learning algorithm, and transmitting the emergency and key video to a disaster remote command terminal; and further transcoding, by the core cloud, the preprocessed video, and performing distribution and transmission to a live video output terminal, wherein the front-end feature point matching comprising:

extracting oriented fast and rotated brief (ORB) feature points from the image data;

computing bag-of-words (BOW) feature vectors of all the ORB feature points of a current frame of the image data, and setting a feature point threshold value to match all the ORB feature points of corresponding nodes between the current frame and a previous frame to obtain a front-end matching pair; and optimizing the front-end matching pair via random sample consensus (RANSAC) to remove the ORB feature points which do not meet the optimization requirements; and computing a pose of the current frame by using the front-end matching pair to perform a perspective-n-point (PNP) algorithm, and re-positioning the UVA based on the pose of the current frame when the UAV is lost in tracking.

2. The cloud-edge-end cooperative control method of a 5G networked UAV for security rescue according to claim 1, wherein the local map building and optimization comprises:

when the ORB feature points are enough, tracking a local map, and updating a local key frame and the ORB feature points;

finding a local matching pair from the local map for the current frame, optimizing the current frame via pose graph optimization, and updating statistical data of map points; and screening for a key frame, and inserting the key frame to provide the key frame for the local map building.

3. The cloud-edge-end cooperative control method of a 5G networked UAV for security rescue according to claim 2, wherein further comprising:

inserting a local key frame into a map;

removing a key frame from the map, which does meet the observation requirements;

performing local bundle adjustment-based map optimization; and checking key frames of a local co-visibility graph of a current key frame, and removing redundant local key frames.

4. The cloud-edge-end cooperative control method of a 5G networked UAV for security rescue according to claim 3, wherein a to-be-removed key frame, which does not meet the observation requirements, in a current map point is a key frame when the proportion of the current map points observed by all key frames is less than 0.25, or a key frame when the current map points are not observed for more than two consecutive frames, or a key frame when the current map points are not continuously observed for three consecutive frames after being observed.

5. The cloud-edge-end cooperative control method of a 5G networked UAV for security rescue according to claim 4, further comprising:

computing an min score (MIN_S) as a reference value by using the key frame of the co-visibility graph and the current key frame, detecting candidate frames meeting the MIN_S from a database, and then performing geometric verification on all the candidate frames, wherein the MIN_S is the lowest matching score of the BOW;

computing feature matching relationships between the current key frame and the candidate frames, setting the current key frame meeting a threshold condition of the local matching pair as a candidate frame, and setting a corresponding solution frame; and performing iterative solution relative motion on the solution frame, performing re-projection matching according to an iterative solution relative motion relationship, and setting the candidate frame as a loopback frame when a matching quantity meets a threshold condition of the re-projection matching.

6. The cloud-edge-end cooperative control method of a 5G networked UAV for security rescue according to claim 5, further comprising:

terminating the bundle adjustment-based map optimization, and updating the key frame of the co-visibility graph corresponding to the current frame;

updating an attitude of the key frame of the co-visibility graph by using an attitude of the current frame estimated based on the loopback frame;

according to the attitude information of the updated key frame, correcting the current frame and the map point corresponding to the key frame of the co-visibility graph corresponding to the current frame, and updating the key frame of the co-visibility graph corresponding to current frame; and optimizing an essential graph, starting the bundle adjustment-based map optimization again, updating the poses of all the key frames, and continuously updating all the map points by using the poses of the optimized key frames to generate a sparse landmark map.

7. The cloud-edge-end cooperative control method of a 5G networked UAV for security rescue according to claim 6, further comprising:
when a pose of a new key frame is generated, determining a position of a projection point via epipolar line search and block matching
computing a depth and uncertainty of a triangulated position of the projection point according to a geometric relationship; and
fusing a result of the computing of the depth and uncertainty with a previous depth information recovery result to obtain recovered depth information, and stopping computation when the recovered depth information is converged, or returning to B when the recovered depth information is not converged.

8. The cloud-edge-end cooperative control method of a 5G networked UAV for security rescue according to claim 6, further comprising:
inputting the three-dimensional dense map into a pre-trained neural network to obtain a feature map;
presetting an ROI for each point in the feature map and sending the ROI to an RPN network for binary classification and BB regression, and filtering out some of candidate ROIs to obtain a target ROI;
matching the three-dimensional dense map with pixels of the feature map, and then matching the feature map with fixed features; and
performing N-category classification, BB regression, and MASK generation on the target ROI.

* * * * *